Patented Apr. 16, 1929.

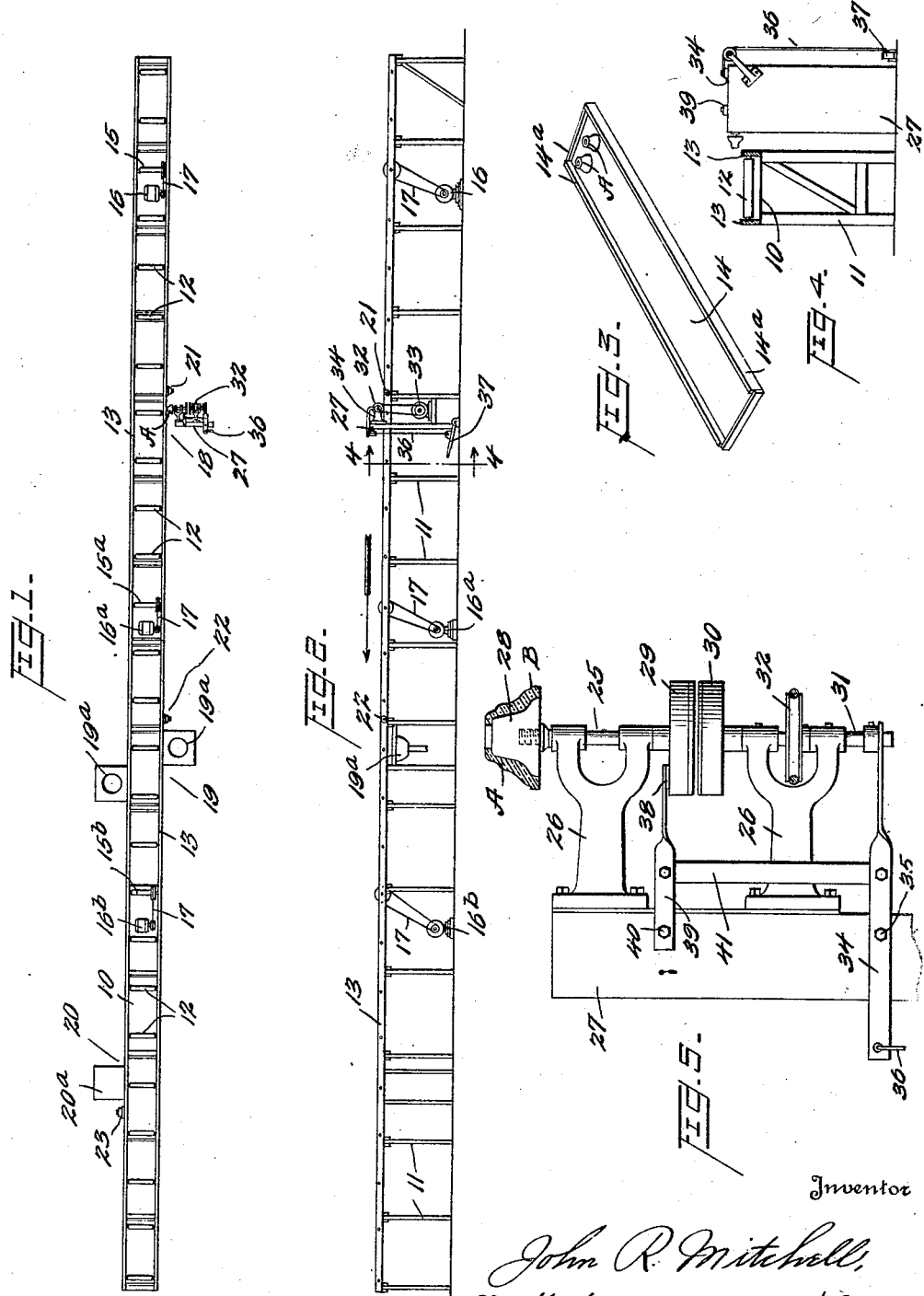

1,709,733

UNITED STATES PATENT OFFICE.

JOHN R. MITCHELL, OF TRENTON, NEW JERSEY.

ARRANGEMENT FOR HANDLING PORCELAIN WARE.

Application filed September 20, 1927. Serial No. 220,818.

This invention relates to an arrangement for handling porcelain ware, particularly after such ware has been pressed or molded and dried and preparatory to placing the same in the kiln. Such pressed and dried ware must be subjected to several operations before it is in condition to go to the kiln. First, it is cleaned, which consists in cutting or trimming off the fin or projection left by the molds; next, it is usually sponged to remove dust and oil previous to dipping; and finally, it is dipped in glaze and the excess glaze cleaned off. The dried ware in the clay state is usually placed on what is termed ware boards and taken to the different operators who perform the operations above noted.

Heretofore, the handling of the ware boards during the various operations above described has been more or less slow and unsystematic and required more or less handling of the ware boards, placing them on racks and carrying the same from place to place by the different operators.

The present invention aims to obviate these defects of the former practice by providing a long table or support on one end of which the ware boards, holding the ware to be treated, are placed one behind the other, such table having at intervals along the same various stations at which the different operations can be performed on the ware and also having means by which the operator at each station can cause one of the ware boards to move along the table up to his station in order to enable the ware to be treated at that station, after which the operator can push the ware board along the table and in position so that the succeeding operator in turn can cause it to move up to his respective station.

A further object is to provide a table which has a plurality of operating stations at intervals along the same with means at each station to cause the ware boards to travel up to each station when desired without the necessity of removing the ware boards from the table until all operations are finished.

A still further object of the invention is to provide an arrangement which will eliminate repeated handling of the ware boards and carrying them from place to place, and which will insure a continuous supply of ware to each operator and thus obviate delay and loss of time.

Various other advantages and benefits of the invention will be apparent to those skilled in the art from the following specification taken in connection with the accompanying drawings which illustrate one specific embodiment thereof.

In the accompanying drawings:

Figure 1 is a longitudinal plan view of an arrangement embodying my invention;

Figure 2 is a side elevation of the same;

Figure 3 is an enlarged perspective view of one of the ware boards;

Figure 4 is a transverse sectional view of the table showing certain of the mechanism associated therewith; and Figure 5 is an enlarged view of one form of mechanism used for performing the cleaning operation.

Referring to the drawings in detail, the numeral 10 indicates generally the table which is supported on a plurality of suitable standards 11 or in any other desired manner. The table 10 is comparatively long and narrow and arranged at intervals along the same is a plurality of idle or freely rotatable anti-friction rollers 12 which extend transversely of the table and which are preferably journaled in upstanding flanges 13 secured at each side of the table. The flanges 13 extend somewhat above the upper surface of the rollers 12. The table is of a width sufficient to receive the ware boards which are adapted to travel along the table and over the rollers 12 and between the side flanges 13. One of the ware boards is illustrated in detail in Fig. 3 and comprises merely a flat board 14 preferably having ribs 14$^a$ around the edge of the same to hold the ware thereon. These ware boards are in effect shallow trays and in practice they are generally made in the neighborhod of six feet in length and about one foot in width.

In addition to the idle rollers 12, the upper portion of the table is also provided with a number of positively driven rollers 15, 15$^a$ and 15$^b$ which are journaled similarly to the idle rollers 12 and each of which is adapted to be driven independently by motors 16, 16$^a$ and 16$^b$ through the medium of suitable belts 17. The rollers 15, 15$^a$ and 15$^b$ are preferably roughened or taped or provided with any suitable kind of friction surface so that as the ware boards engage said rollers they will be caused to move along the table.

Arranged along the table 10 is a plurality of stations indicated by the numerals 18, 19 and 20. The station 18 is preferably the one at which the cleaning operation, later described, is adapted to be performed. At the station 19 the pieces of ware are sponged to remove dust and grease therefrom, suitable basins 19ª being provided at this station. At the station 20 the pieces of ware are dipped in the glaze which may be contained in a suitable receptacle indicated at 20ª and the excess glaze removed.

A switch 21 arranged at the station 18 controls the motor 16 so that the operator at that station by manipulating this switch can start and stop rotation of the roller 15 as desired. Similarly a switch 22 at station 19 controls the roller 15ª and a switch 23 at station 20 controls the roller 15ᵇ.

Referring now to the general operation of the device, it will be understood that the ware boards filled with ware are deposited upon the end of the table 10 shown at the right in Figs. 1 and 2. When the operator at the first station 18 is ready to begin operations, he starts the motor 16 by means of the switch 21. This causes rotation of the roller 15 which, engaging beneath the ware board above the same, moves the ware board up into the vicinity of the operator at station 18 where it will remain stationary. The operator then performs the cleaning operation upon the various pieces of ware upon the board, the cleaned pieces being again deposited upon the board.

After the operator at this station has completed his work on one board, he pushes the same forwardly over the idle rollers 12 until the board comes into engagement with the following driven roller 15ª.

When the operator at the second station 19 is ready to begin operations, he starts the motor 16ª through the medium of the switch 22 which causes the roller 15ª to advance the ware board up to the vicinity of station 19. When the operator at this station has finished his operations upon the ware and replaced the same upon the board, he moves the board along the table until it engages the succeeding driven roller 15ᵇ.

The operator at station 20 through switch 23 controls the rotation of the driven roller 15ᵇ so that the ware board which has been moved into engagement with said roller by the preceding operator may be caused to travel up to the vicinity of station 20, where the ware is further treated.

From the foregoing it will be clear that the driven rollers 15, 15ª, 15ᵇ are spaced apart a distance greater than the length of the ware boards or, in other words, the roller at the front of and in the rear of each station is sufficiently spaced to permit a ware board to rest on the table or support at each station without being in contact with the driven roller in front of or following said station.

Any number of successive operations may thus be performed on the ware without removing the ware board from the table until the operations are completed, when the ware board may be removed and deposited at any suitable place desired.

It is, of course, understood that the ware boards travel along the table 10 one after another so that there is always a supply of material for the different operators, thus obviating any substantial delay or loss of time in transporting the boards from one operator to another. Thus, while one operator is treating material from one of the boards, the other operator will be treating material from other boards. In other words, there is a stream of ware boards passing along the table at all times so that there is no delay in supplying material to the different operators and no necessity for carrying the boards from place to place as heretofore. The result is more rapid operation and increased output for a given number of operators, as well as less handling of the ware and breakage thereof.

A brief description of the cleaning mechanism employed at the station 18 is thought advisable. The particular mechanism employed is illustrated in Fig. 5 and comprises a shaft 25 journaled in a suitable support 26 secured to a base 27, the shaft 25 carrying a head 28 which is shaped to receive the particular type of ware which is being operated upon. The head 28 is removable so that different shaped heads may be used when different forms of ware are being treated. The shaft 25 carries a friction disk 29. A similar disk 30 is carried by a shaft 31 which is arranged coaxially with the shaft 25 and which may be moved axially to bring the disk 30 into engagement with the disk 29. The shaft 31 is driven by a belt wheel 32 from a motor 33. The shaft 31 may be moved axially by means of a lever 34 pivoted at 35 to the base 27, and connected by means of a cable 36 to a treadle 37. It is evident that when the treadle 37 is depressed the disks 29 and 30 will be caused to engage, whereby shaft 25 is caused to rotate. A friction brake 38 is adapted to bear against the disk 29 to prevent rotation of the shaft 25 when not desired, this brake being carried by a lever 39 pivoted at 40 to the base 27 and connected by a link 41 to the lever 34 so that when the lever 34 is operated to bring the disks 29 and 30 into contact, the brake 38 is moved out of contact with the disk 29. To effect the cleaning of the ware by this mechanism, a piece of ware A is placed on the head 28 and the shaft 25 caused to rotate. During such rotation the operator simply holds a knife against the piece A when the fin illustrated at B is cleanly and evenly trimmed off.

Various changes may, of course, be made in the specific details of the mechanism without departing from the invention or sacrificing any of the benefits thereof.

Having thus described the invention, what is claimed as new and desired to be secured by Letters Patent is:

1. An arrangement for handling porcelain ware comprising in combination a table along which ware boards are adapted to travel, a plurality of stations arranged along said table at which operations are to be performed upon the ware, a plurality of independent propelling means arranged along said table, one in advance of each station, for causing the ware boards to travel up to the vicinity of each station, and independent means adjacent each station for controlling the propelling means in advance of that station.

2. An arrangement for handling porcelain ware comprising in combination, a table along which ware boards are adapted to travel, a plurality of stations arranged along said table at which operations are to be performed upon the ware, independent means for engaging the ware boards in advance of each station and moving the same up to the vicinity of the station, and independent means at each station for throwing into and out of operation the ware board moving means in advance of that station.

3. An arrangement for handling porcelain ware comprising in combination, a table along which ware boards are adapted to travel, a plurality of stations arranged along said table at which operations are to be performed on the ware, a plurality of independent power driven rollers arranged along said table one in advance of each station and each being adapted to engage and move a ware board up to the vicinity of the following station, means for driving each of said rollers, and independent means at each station for controlling the driving means for the driven roller in advance of that station.

4. An arrangement for handling porcelain ware comprising in combination, a table along which ware boards are adapted to travel, a plurality of stations arranged along said table at which operations are to be performed on the ware, a plurality of independently driven rollers arranged along said table, one in advance of each station, and each being adapted to engage and move a ware board up to the vicinity of the following station, a separate motor for driving each of said rollers, and a switch adjacent each station for controlling the driving motor for the roller in advance of that station.

5. An arrangement for handling porcelain ware comprising in combination, a support along which ware boards are adapted to travel, a plurality of stations arranged along said support at which operations are to be performed upon the ware, a plurality of driven rollers arranged along said support, each of said stations being positioned between two of said driven rollers, the distance between each two of said rollers being such that a ware board may rest on said support adjacent each station and be free from contact with the preceding or succeeding roller, a separate electric motor for driving each of said rollers, and a switch at each station for controlling the driving motor for the roller in advance of that station.

6. An arrangement for handling porcelain ware comprising in combination, a support along which ware boards are adapted to travel, driven rollers arranged at intervals along said support and spaced apart a distance greater than the length of the ware boards, a plurality of stations arranged along said support, at which operations are to be performed on the ware, one station being intermediate each pair of said rollers, independent means for driving each of said rollers, and independent means at each station for throwing into and out of operation the roller in advance of that station.

7. An arrangement for handling porcelain ware comprising in combination a table along which ware boards are adapted to travel, a plurality of stations arranged along said table at which operations are to be performed upon the ware, a plurality of propelling means arranged along said table, one in advance of each station, for causing the ware boards to travel up to the vicinity of each station, and means adjacent each station for controlling the propelling means in advance of that station, the propelling means in front of and in the rear of each station being spaced a sufficient distance to permit a ware board to rest on said support adjacent each station and be out of engagement with either of said propelling means.

In testimony whereof I hereunto affix my signature.

JOHN R. MITCHELL.